United States Patent [19]

Kang

[11] Patent Number: 6,009,210
[45] Date of Patent: *Dec. 28, 1999

[54] HANDS-FREE INTERFACE TO A VIRTUAL REALITY ENVIRONMENT USING HEAD TRACKING

[75] Inventor: Sing Bing Kang, Cambridge, Mass.

[73] Assignee: Digital Equipment Corporation, Maynard, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/811,674

[22] Filed: Mar. 5, 1997

[51] Int. Cl.$^6$ ........................................................ G06K 9/36
[52] U.S. Cl. .......................... 382/276; 382/154; 382/107; 345/156; 345/419
[58] Field of Search ..................................... 345/419, 427, 345/8, 156–158, 7, 9; 348/36, 39; 600/595; 702/153, 152; 382/276, 154, 103, 104, 107

[56] References Cited

U.S. PATENT DOCUMENTS

| | | | |
|---|---|---|---|
| 5,130,794 | 7/1992 | Ritchey | 348/39 |
| 5,148,477 | 9/1992 | Neely et al. | 382/107 |
| 5,227,985 | 7/1993 | DeMenthon | 702/153 |
| 5,287,437 | 2/1994 | Deering | 345/427 |
| 5,323,470 | 6/1994 | Kara et al. | 382/103 |
| 5,373,857 | 12/1994 | Travers et al. | 600/595 |
| 5,446,834 | 8/1995 | Deering | 345/427 |
| 5,581,271 | 12/1996 | Kraemer | 345/8 |
| 5,629,988 | 5/1997 | Burt et al. | 382/276 |
| 5,686,957 | 11/1997 | Baker | 348/36 |
| 5,751,838 | 5/1998 | Cox et al. | 382/107 |
| 5,802,220 | 9/1998 | Black et al. | 382/276 |

OTHER PUBLICATIONS

"3–D Motion Estimation in Model–Based Facial Image Coding", Haibo Li, Student Member, IEEE, Pertti Roivainen, and Robert Forchheimer, "IEEE Transactions on Pattern Analysis and Machine Intelligence", vol. 15, No. 6, Jun. 1993, pp. 545–555.

"Real–Time Facial–Feature Tracking Based on Matching Techniques and Its Applications", Hiroshi Sako, Mark Whitehouse, Anthony Smith, and Alistair Sutherland, Hitachi Europe Ltd., Research and Development Centre, Dublin Laboratory (HDL), O'Reilly Institute, Trinity College, Dublin 2, Ireland, IEEE, 1994, pp. 320–324.

"Estimating Gaze from a Single View of a Face", Andrew Gee and Roberto Cipolla, University of Cambridge, Department of Engineering, Cambridge CB2 1PZ, England IEEE, 1994, pp. 758–760.

"Computing 3–D Head Orientation from a Monocular Image Sequence", Thanarat Horprasert, Yaser Yacoob and Larry S. Davis, IEEE, 1996, pp. 242–247.

"Visually Controlled Graphics", A. Azarbayejani, T. Starner, B. Horowitz, and A. Pentland, IEEE Transactions on Pattern Analysis and Machine Intelligence, vol. 15, No. 6, Jun. 1993, pp. 602–605.

(List continued on next page.)

Primary Examiner—Leo H. Boudreau
Assistant Examiner—I. Sherali
Attorney, Agent, or Firm—Jenkens & Gilchrist, P.C.

[57] ABSTRACT

A hands-free navigation system for tracking a head and responsively adjusting the display of a virtual reality environment includes a camera, the camera employed to follow movements of the head, a computer system connected to the camera, the computer system including a memory, a central processing unit (CPU), a digitizer, the digitizer providing a current image of a face of the head, a face tracker, the face tracker including the capability of receiving a reference face image from the digitizer, of receiving the current face image from the digitizer, of determining a head translation and orientation, and of providing the head translation and orientation to a three dimensional virtual environment viewer connected to the computer system for display of the virtual environment at the desired viewpoint.

9 Claims, 4 Drawing Sheets

OTHER PUBLICATIONS

"The Integration of Optical Flow and Deformable Models with Applications to Human Face Shape and Motion Estimation", Douglas DeCarlo and Dimitris Metaxas, IEEE, 1996, pp. 231–238.

"A Vision System for Observing and Extracting Facial Action Parameters", Irfan A. Essa and Alex Pentland, IEEE, 1994, pp. 76–83.

"Robotic Assembly Operation Based on Task–Level Teaching in Virtual Reality", Tomoichi Takahashi and Hiroyuki Ogata, IEEE Computer Society, pp. 1083–1088.

"Detection and Pose Estimation of Human Face with Synthesized Image Models", Akitoshi Tsukamoto, Chil–Woo Lee and Saburo Tsuji, IEEE Computer Society, 1994, pp. 754–757.

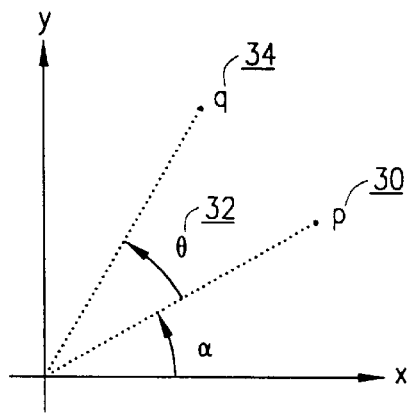
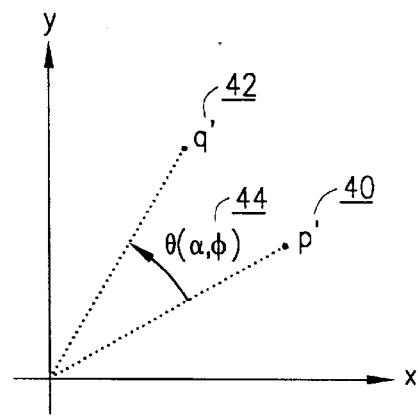
*FIG. 2A*     *FIG. 2B*
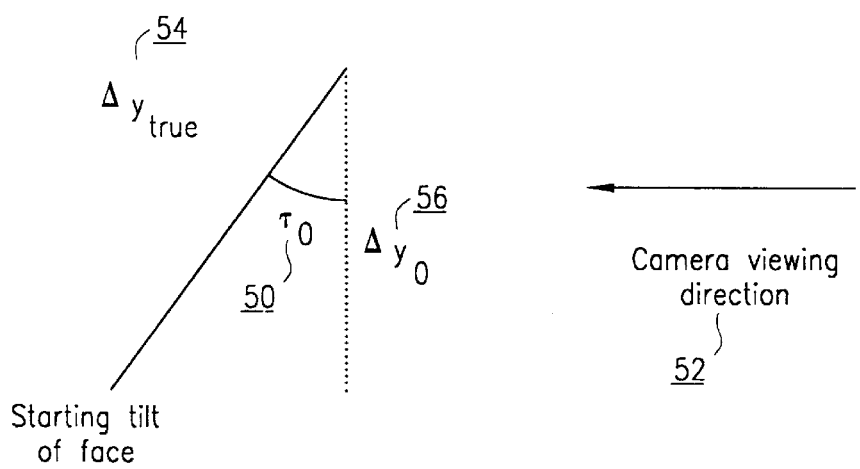
*FIG. 3*

HANDS-FREE INTERFACE TO A VIRTUAL REALITY ENVIRONMENT USING HEAD TRACKING

BACKGROUND OF THE INVENTION

The present invention relates to the field of virtual reality in computer systems, and more particularly to a method of hands-free navigation in a computer-controlled environment.

As is known in the art, conventional methods of navigating within a virtual reality (VR) environment involve the use of interfaces such as keyboards, hand-held input devices such as joysticks, mice, and trackballs, and hand-worn datagloves. And as is also known, while these devices are mostly adequate, they are rather obtrusive and require some amount of training to use. More recently, those skilled in this art have begun investigating into using these interfaces to interpret human gestures. Because of the constant physical use and manipulation, it is known in the art that these interfaces either have limited life or require some degree of maintenance. Thus, those skilled in this art have begun investigating into natural non-tactile interfaces that are intuitively simple and unobtrusive to the user. Natural interfaces generally refer to communication by way of human gestures and/or speech.

As is known, prior approaches to controlling interaction in a virtual environment have been limited to using hand gestures for games or for manipulating virtual objects using a dataglove. As is also known, several approaches to face tracking have been employed. For example, in one approach, a full face is tracked using a detailed face model that relies on image intensity values, deformable model dynamics, and optical flow. This representation can be used to track facial expressions. Due to the complexity of this approach, processing between frames is reported to take three seconds each on a 200 MHZ SGI machine. Furthermore, initialization of the face model on the real image involves manually marking face locations, and is known to take two minutes on the same 200 MHZ SGI machine.

In another approach, a face model in the form of a 3-D mesh is used. In this approach, emphasis is placed on the recognition of facial expressions, and the approach assumes that there is no facial global translation or rotation.

Other approaches require detection of specific facial features and ratios of distances between facial features. For example, in one approach, the gaze direction is estimated from the locations of specific features of the face, namely eye corners, tip of the nose, and corners of the mouth. With this approach the features are manually chosen.

In still another approach, 3-D head orientation is estimated by tracking five points on the face (four at the eye corners and one at the tip of the nose). Here again the facial features are selected by hand.

Other arrangements have described real-time, i.e., 20 frames per second, facial feature tracking systems based on template matching. These systems include the DataCube real-time image processing equipment. In this arrangement, the face and mouth areas are extracted using color histogranmming while the eyes are tracked using sequential template matching. One such application of this arrangement is the so called "visual mouse," which emulates the functionality of a physical mouse through eye position (cursor movement) and mouth shape change (clicking operation). Here again, this arrangement tracks specific features of the face and those skilled in this art debate whether this form of tracking (i.e., sequential) is stable over time and whether reliable face orientation can be derived from so few features.

Other methods known in this art use a 3-D planar polygonized face model and assume 3-D affine motion of points. They typically track the motion of the face model (both local and global) using optical flow to estimate the facial action units (based on the facial action coding system, or FACS. Generally with these methods a feedback loop scheme is employed to minimize the error between the synthetically generated face image based on motion estimates and the true face image. However, it is known that with these methods one has to estimate the depth of the face, assumed segmented out, in the scene. The feature node points of the face model are manually adjusted to initially fit the face in the image.

In still another approach, a system tracks manually picked points on the head, and based on recursive structure from motion estimates and Extended Kaiman filtering, determines the 3-D pose of the head. The frame rate achieved is typically 10 frames per second. With such an approach the system requires local point feature trackers.

Another approach uses what is referred to as block-based template matching. This approach takes many image samples of faces (152 images of 22 people), partitions the images into chunks of blocks (each of which is 5×7 pixels), and computes statistics of the intensity and strength of edges within each block. The results are then used as a template to determine the existence of a face in an image as well as its orientation. In comparison, the initial steps of sampling faces and performing statistical analysis of the samples are not required in this approach. In addition, the orientation of the face is determined by interpolating between known sampled face orientations. The approach measures directly the face orientation without any interpolation scheme.

Consequently, an approach is needed to navigate virtual reality environments in a simple, intuitive, and unobtrusive manner, and which requires only commercially available products such as a camera and an image digitizer.

SUMMARY OF THE INVENTION

In accordance with the present invention, a hands-free navigation system for tracking a head and responsively adjusting the display of a virtual reality environment is provided including a camera, the camera employed to follow movements of the head, a computer system connected to the camera, the computer system including a memory, a central processing unit (CPU), a digitizer, the digitizer providing a current image of a face of the head, a face tracker, the face tracker including the capability of receiving a reference face image from the digitizer, of receiving the current face image from the digitizer, of determining a head translation and orientation, and of providing the head translation and orientation to a three dimensional environment viewer connected to the computer system for display of the face. With such a system, the problem of navigating within a virtual environment without the use of keyboards, hand-held input devices, and datagloves is addressed. The system tracks the pose (i.e., translation and orientation) of the face and uses that information to move and orient the virtual environment accordingly. Furthermore, the entire face image is tracked without the use of a geometric face model.

DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanied drawings, wherein:

FIGS. 2A and 2B are graphs illustrating the effect of tilt ($\tau$) on perceived image rotation;

FIG. 3 is a graph showing a starting tilt $\tau_0$ of the face (represented as planar patch) relative to a camera viewing direction;

DETAILED DESCRIPTION OF THE PREFERRED EMBODIMENT(S)

Figure 1:
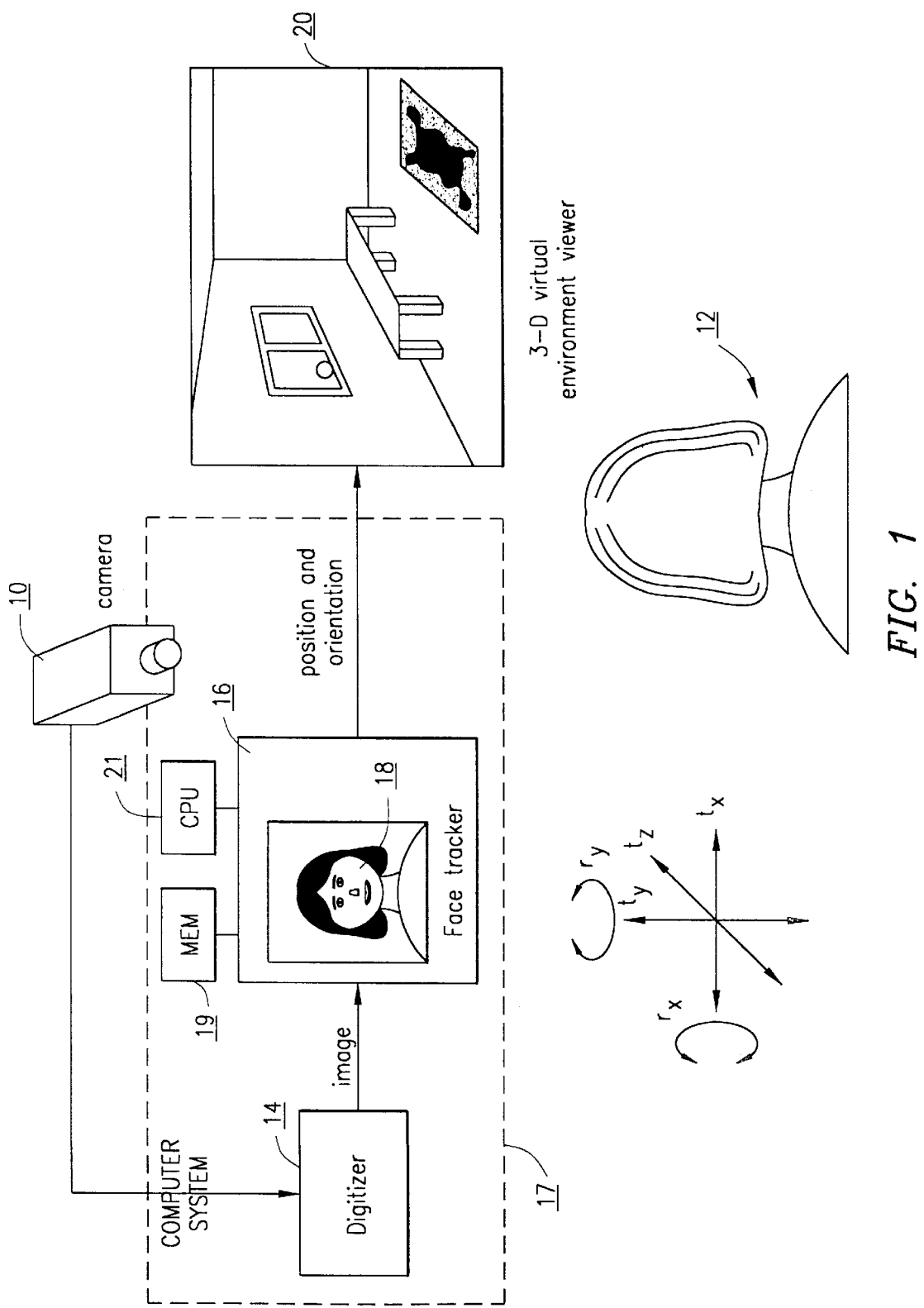
FIG. 1 is a block diagram of a hands-free navigation system according to the principles of the present invention.

Referring to FIG. 1, a hands-free navigation system according to the principles of the present invention is shown to include a camera 10. The camera 10 is mounted in front and above a user 12. The camera 10 is further shown connected to a digitizer 14. The digitizer 14 converts the face of the user 12 into a digitized image which is further displayed on a face tracker 16. The camera 10 views the face of the user 12 from a tilted angle. The digitizer 14 and face tracker 16 are typically part of a computer system 17. The preferred embodiment of the hands-free navigation system shown in FIG. 1 requires a reference face image 18, and this image 18 is captured for initialization. The reference face image 18 is that of the user 12 in a neutral pose, where he/she is facing directly ahead and below the camera 10. As will be described fully below, to determine a head translation and orientation, the face tracker 16 warps the reference face image 18 to minimize the difference between the warped reference face image 18 and the current face image. This is equivalent to using the reference face image 18 as a globally deformable template. The warping matrix transformation is then decomposed to yield the face translation and orientation. Subsequently, the view point of the 3-D virtual environment 20 changes accordingly.

As may be seen in FIG. 1, tracked head motions may be described with reference to five variables, i.e., $t_x$, $t_y$, $t_z$: translation in x, y, and z, respectively, and $r_x$ and $r_y$: rotation about the x and y axes, respectively.

In the preferred embodiment, the software is written in the C programming language, and is run on a Digital Equipment Corporation AlphaStation 600. Also in the preferred embodiment, a 3-D virtual environment viewer used for the present invention is VRweb, which was originally developed by the Institute for Information Processing and Computer Supported New Media (IICM), Graz University of Technology, in Austria. In navigating a virtual environment, it is very likely that the user would not want to rotate the scene about the viewing direction. Hence, the present embodiment disables control of rotational motion about the viewing axis, i.e., rotation about $t_z$ vector in FIG. 1.

For convenience, the preferred embodiment is described fully by initially describing general global motion tracking, i.e., full two dimensional (2-D) perspective tracking, and how a 2-D motion matrix is decomposed directly into various motion parameters such as translation, magnification, and skew. Since the face 12 is assumed to be relatively far away from the camera 10, an affine model is assumed rather than a full 2-D perspective model. As will be further described, the motion parameters can be used to extract head translation and orientation.

2-D Perspective Tracking

The preferred embodiment seeks to directly mninimize the discrepancy in intensities between pairs of images after applying the transformation it is recovering. This has the advantage of not requiring any specific feature points, and of being statistically optimal. The present invention minimizes the sum of the squared intensity errors:

$$E = \sum_i [I'(x_i', y_i') - I(x_i, y_i)]^2 = \sum_i e_i^2$$

subject to the constraint $$x_i' = \frac{m_{00} x_i + m_{01} y_i + m_{02}}{m_{20} x_i + m_{21} y_i + 1}, \quad y_i' = \frac{m_{10} x_i + m_{11} y_i + m_{12}}{m_{20} x_i + m_{21} y_i + 1}.$$

The objective function E is applied over the region of interest.

In the preferred embodiment, the minimization of E is done using the Levenberg-Marquardt iterative non-linear minimization algorithm as described in *Numerical Recipes in C: The Art of Scientific Computing* by W. H. Press et al, Cambridge University Press, Cambridge, England, second edition, 1993. This algorithm requires the computation of the partial derivatives of $e_i$ with respect to the unknown motion parameters $\{m_{00} \ldots m_{21}\}$. These are straightforward to compute, i.e., $$\frac{\partial e_i}{\partial m_0} = \frac{x_i}{D_i} \frac{\partial I'}{\partial x'}, \ldots, \frac{\partial e_i}{\partial m_7} = -\frac{y_i}{D_i} \left( x_i' \frac{\partial I'}{\partial x'} + y_i' \frac{\partial I'}{\partial y'} \right),$$

where $D_i$ is the denominator in Equation (2), and ($\partial I'/\partial x'$, $\partial I'/\partial y'$) is the image intensity gradient of ($x_i'$, $y_i'$). From these partials, the Levenberg-Marquardt algorithm computes an approximate Hessian matrix A and the weighted gradient vector b with components $$a_{kl} = 2 \sum_i \frac{\partial e_i}{\partial m_k} \frac{\partial e_i}{\partial m_l}, \quad b_k = -2 \sum_i e_i \frac{\partial e_i}{\partial m_k},$$

and then updates the motion parameter estimate m by an amount $\Delta m = (A + \mu I)^{-1} b$, where $\mu$ is a time-varying stabilization parameter as described in Press et al. The advantage of using Levenberg-Marquardt over straightforward gradient descent is that it converges in fewer iterations.

To enable the tracker 16 to be more tolerant of larger displacements, the preferred embodiment employs a hierarchical scheme where coarse estimates are first found at coarse resolutions to be refined at higher resolutions. With such a scheme, one can specify an arbitrary number of resolution levels and iteration at each level. In the preferred embodiment the number of resolutions is set to be 3 and the number of iterations per level is set to be 3.

Decomposition of full 2-D perspective matrix

Given the full 2-D perspective matrix, it can be decomposed into the following warping parameters:

center point or displacement $t_x$ and $t_y$ (in x and y directions, respectively)

rotation angle $\theta_1$ (about the viewing axis)

zoom factor $\zeta$ aspect ratio a skew factor s pinch parameters $\xi_x$ and $\xi_y$ (in x and y directions, respectively)

Specifically, define $$r_x = \zeta a \text{ and } r_y = \frac{\zeta}{a},$$

and let $s_\theta = \sin \theta_1$ and $c_\theta = \cos \theta_1$.

Then the 2-D perspective matrix (which is first scaled such that $m_{22}=1$) can be decomposed as follows:

$$\begin{pmatrix} m_{00} & m_{01} & m_{02} \\ m_{10} & m_{11} & m_{12} \\ m_{20} & m_{21} & 1 \end{pmatrix} = \begin{pmatrix} 1 & 0 & t_x \\ 0 & 1 & t_y \\ 0 & 0 & 1 \end{pmatrix} \begin{pmatrix} c_\theta & -s_\theta & 0 \\ s_\theta & c_\theta & 0 \\ 0 & 0 & 1 \end{pmatrix} \begin{pmatrix} r_x & 0 & 0 \\ 0 & r_y & 0 \\ 0 & 0 & 1 \end{pmatrix} \begin{pmatrix} 1 & s & 0 \\ 0 & 1 & 0 \\ 0 & 0 & 1 \end{pmatrix}$$

$$\begin{pmatrix} 1 & 0 & 0 \\ 0 & 1 & 0 \\ \xi_x & \xi_y & 1 \end{pmatrix}$$

$$= \begin{pmatrix} c_\theta r_x + \xi_x t_x & c_\theta s r_x - s_\theta r_y + \xi_y t_x & t_x \\ s_\theta r_x + \xi_x t_y & c_\theta s r_x + c_\theta r_y + \xi_y t_y & t_y \\ \xi_x & \xi_y & 1 \end{pmatrix}$$

Since the recovery of the full 2-D perspective matrix from two images is generally relatively unstable if these images are small or have little intensity variation, an approximation of the 2-D perspective model is used, namely a 2-D affine model.

For the 2-D affine case, set $m_{20}=m_{21}=0$ and $\xi_x=\xi_y=0$, yielding $$\begin{pmatrix} m_{00} & m_{01} & m_{02} \\ m_{10} & m_{11} & m_{12} \\ 0 & 0 & 1 \end{pmatrix} = \begin{pmatrix} c_\theta r_x & c_\theta s r_x - s_\theta r_y & t_x \\ s_\theta r_x & s_\theta s r_x + c_\theta r_y & t_y \\ 0 & 0 & 1 \end{pmatrix}$$

The 2-D affine transformation of the image is applicable for the affine camera. The affine camera has the projection matrix of the form $$T_{affine} = \begin{pmatrix} T_{00} & T_{01} & T_{02} & T_{03} \\ T_{10} & T_{11} & T_{12} & T_{13} \\ 0 & 0 & 0 & 1 \end{pmatrix} = \begin{pmatrix} M & m \\ 0^T & 1 \end{pmatrix}$$

If p is the three dimensional (3-D) point in space and u is the corresponding affine projection, then $$u = Mp + m$$

In the affine camera model, all epipolar lines are parallel, and the epipoles are located at infinity in the image planes. This camera model is a generalization of the scaled orthographic (also known as weak perspective or paraperspective) camera model, which can be used as a good approximation if the change in relative object depth is small compared to its distance to the camera.

Full 2-D perspective image transformation can only be used in cases of planar surfaces using the perspective camera model and rotation about the camera optic center. The 2-D affine image transformation can be used only in the cases of planar surfaces and translation under the affine camera model.

To illustrate this, let 3-D point p be a point on a planar patch whose unit normal is n. Let also $n_{\perp,1}$ and $n_{\perp,2}$ be the other two unit vectors that with n, form the orthogonal bases of $\Re^3$. This p can be specified as $$p = \alpha \hat{n}_{\perp,1} + \beta \hat{n}_{\perp,2} + \lambda \hat{n}$$

p lies on the plane whose equation is $p \cdot n = \lambda$, $\lambda$ being a constant.

If R is a 3×3 rotation matrix such that $$R\hat{n} = \begin{pmatrix} 0 \\ 0 \\ 1 \end{pmatrix}; R\hat{n}_{\perp,1} = \begin{pmatrix} g_1 \\ 0 \\ 0 \end{pmatrix}; R\hat{n}_{\perp,2} = \begin{pmatrix} g_2 \\ 0 \\ 0 \end{pmatrix}$$

then from Equation 9, $$u = M R^{-1} R p + m$$

$$= M_R \begin{pmatrix} \alpha g_1 + \beta g_2 \\ \lambda \end{pmatrix} + m$$

where $M_R = MR^{-1}$. $M_R$ is now partitioned as (B|b), after which equation 12 may be rewritten as $$u = B(\alpha g_1 + \beta g_2) + \lambda b + m$$

$$= B(\alpha g_1 + \beta g_2) + b_\lambda$$

with $b_\lambda = \lambda b + m$. As can be seen, the only variables on the right hand side of the above equation that depend on 3-D point location on the plane are $\alpha$ and $\beta$.

Similarly, for another affine camera, $$u' = B'(\alpha g_1 + \beta g_2) + \lambda b' + m'$$

$$= B'(\alpha g_1 + \beta g_2) + b'_\lambda$$

Eliminating $(\alpha g_1 + \beta g_2)$ from the previous two equations yields $$u' = \Gamma u + \epsilon$$

where $\Gamma = B'B^{-1}$ and $\epsilon = b'_\lambda - \Gamma b_\lambda$. Hence u' is an affine transformation of u for points on a plane.

If the 3-D translation is $\Delta p$, then $$u' = M(p + \Delta p) + m = u + M\Delta p$$

In this case, the image transform is a translation as well.

Using affine tracking to determine limited head pose

As was shown above, the 2-D affine transformation is valid for planar surfaces with an affine camera model. This is a good approximation if the face is far away enough from the camera. This has the effect of rendering the relative depth change in the face to be insignificant relative to the distance of the face from the camera. The face can then be approximated as a planar surface.

The present invention capitalizes on the decomposition of the 2-D affine matrix to determine head pose (i.e., location and orientation). However, in navigating a virtual environment, it is very likely that the user would not want to rotate the scene about the viewing direction. Hence the preferred embodiment adopts this convenient assumption, and disables control of rotational motion about the viewing axis.

To keep the camera relatively unobtrusive to the user, it is better to position it higher up above the monitor and allow it to track the user's head from that location at a tilted angle. This location has a convenient side-effect, i.e., head rotations to either side result in rotations about the viewing axis, which can be easily obtained from the affine matrix decomposition.

Referring now to FIG. 2, the effect of tilt (τ) on perceived rotation is illustrated in graphical fashion. In FIG. 2A, τ=π/2 (viewing the head from a top view) in FIG. 2B, 0<τ<π/2 (viewing a head from a tilted angle). The preferred embodiment assumes that perspective effects are negligible. The point p 30 has rotated by an angle θ 32 to q 34 in FIG. 2A. Seen from an angle in FIG. 2B, the corresponding points are p' 40 and q' 42, and the perceived rotation angle is θ(α, τ) 44, where α is the original angle subtended by p 30 with respect to the x-axis and τ is the tilt angle about the x-axis.

Without loss of generality, the preferred embodiment assumes that both p 30 and q 34 are unit distance from the origin. Hence, $$p = \begin{pmatrix} \cos\alpha \\ \sin\alpha \end{pmatrix}; q = \begin{pmatrix} \cos(\alpha+\theta) \\ \sin(\alpha+\theta) \end{pmatrix};$$

$$p' = \begin{pmatrix} \cos\alpha \\ \sin\alpha\sin\tau \end{pmatrix}; q' = \begin{pmatrix} \cos(\alpha+\theta) \\ \sin(\alpha+\theta)\sin\tau \end{pmatrix}$$

From the above equation, θ(α, τ) 44 of FIG. 2B may be recovered as:

$$\theta(\alpha, \tau) = \cos^{-1}\left(\frac{\cos\alpha\cos(\alpha+\theta) + \sin\alpha\sin(\alpha+\theta)\sin^2\tau}{\sqrt{(\cos^2(\alpha+\theta) + \sin^2(\alpha+\theta)\sin^2\tau)(\cos^2\alpha + \sin^2\alpha\sin^2\tau)}}\right)$$

For the case where the starting head pose is with the head facing horizontally below the camera (which the preferred embodiment assumes), i.e., α=π/2, the previous equation leads to:

$$\theta\left(\frac{\pi}{2}, \tau\right) = \theta_I = \cos^{-1}\left(\frac{\cos\theta\sin\tau}{\sqrt{\sin^2\theta + \cos^2\theta\sin^2\tau}}\right)$$

To track the location of the head, the preferred embodiment tracks the center of the affine patch which is given by $t_x$ and $t_y$. Motion in the forward/backward direction is given by the amount of zoom ζ. Due to the camera tilt, moving the head ahead has the undesirable effect of giving an image displacement in the y direction as well. The solution is to disable all other motion while zooming is detected.

If one knows τ from Equation 22 below, the true head rotation is then $$\theta = \tan^{-1}(\tan\theta_I \sin\tau)$$

Finally, the head tilt is determined from the amount of y magnification $r_y$. Because the camera is situated at a vertical angle with respect to the head, tilting up to face the camera results in larger $r_y$ (y extent is larger than usual, hence greater than 1), while tilting the head down has the opposite effect. FIG. 3 illustrates a starting tilt $\tau_0$ 50 of the face (represented as planar patch) relative to a camera viewing direction 52. $\Delta y_{true}$ 54 is a true facial height while $\Delta y_0$ 56 is an apparent facial height. Here again, the preferred embodiment assumes insignificant perspective effects. In the absence of all other motion parameters, the apparent facial height is $$\Delta y = r_y \Delta y_0 = r_y \Delta y_{true} \cos\tau_0$$

Thus, the face tilt angle is given by $$\tau = \cos^{-1}\left(\frac{\Delta y}{\Delta y_{true}}\right) = \cos^{-1}(r_y \cos\tau_0)$$

To determine $\tau_0$ 50, one applies a "calibration" technique in which the user tilts his/her head up and down once. The system keeps track of the maximum value of $r_y$, i.e., $r_{y,max}$. Then $$\tau_0 = \cos^{-1}\left(\frac{1}{r_{y,max}}\right)$$

The face tilt angle (with respect to the real environment) that is used to control the orientation of the virtual environment is $$\tau' = \tau - \tau_0 = \cos^{-1}(r_y \cos\tau_0) - \tau_0$$

Controlling the view

Even though the preferred embodiment is able to extract the 5 pose parameters of the face, there still exists the problem of using them to control the viewing of the virtual reality environment. One simple way would be to directly use the pose parameters to determine the absolute position and orientation of the viewpoint. However, this limits the viewpoint selection to the pose that the face can assume within the camera viewing space.

The alternative is to control the viewpoint incrementally, i.e., by changing the viewpoint of the virtual reality environment in direct response to the change in the pose of the face relative to the previous pose. To indicate continuous movement within the virtual reality environment beyond what the absolute pose of the face is able to convey, the preferred embodiment includes the ability for the face tracker to detect and respond to the lingering deviation from the reference pose. For example, if the user is interested in rotating to the left continuously, he/she would rotate his/her head to the left and maintain that posture. The system would respond by first turning the viewpoint of the virtual scene. However, because it detected the same deviated face posture longer than a preset time threshold (2 seconds in the preferred embodiment), it continues to rotate the viewpoint of the virtual scene in the same manner until the head posture changes.

To minimize the possibility of sudden jumps in consecutive viewpoints, the preferred embodiment employs a simple Kalman-based filter to smooth the motion trajectory.

Figure 4:
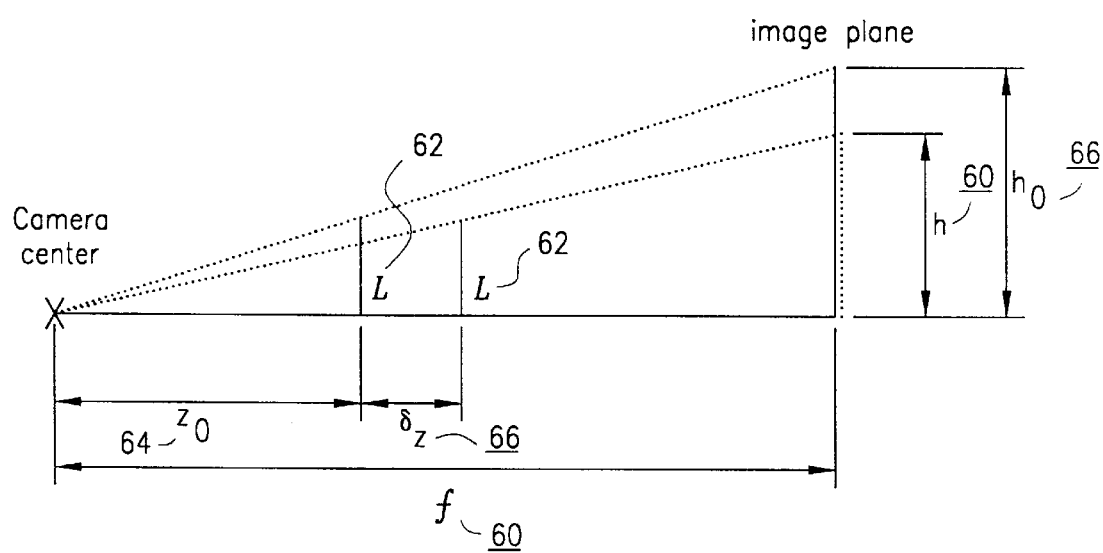
FIG. 4 is a graph showing the effect of moving along the camera axis.

Referring to FIG. 4, the effect of moving along the camera axis is shown in graphical format. In FIG. 4, f 60 is the camera focal length, L 62 is the length of the object, $z_0$ 64 is the reference location, $\delta_z$ 66 is the change in object location, and $h_0$ 66 and h 68 are the projected images lengths (in pixels) of the object at positions $z_0$ and $(z_0+\delta_0)$ respectively.

While the orientation angles of tilt and pan can be directly used, translational scaling factors in x, y, and z are still needed. These are dependent on the relative scaling of the virtual environment. However, converting amount of zoom ζ to change in depth z is less direct. From FIG. 4, $z_0$ 64 is the reference depth location of the face. If the face has moved by $\delta_z$ 66 then by similarity of triangles $$\frac{L}{z_0} = \frac{h_0}{f} \quad \text{and} \quad \frac{L}{z_0 + \delta_z} = \frac{h}{f},$$

with $h = \zeta h_0$. Thus, $$\frac{L}{z_0 + \delta_z} = \zeta \frac{h_0}{f} = \zeta \frac{L}{z_0}$$

from which $$\delta_z = z_0 \left( \frac{1}{\zeta} - 1 \right)$$

Figure 5:
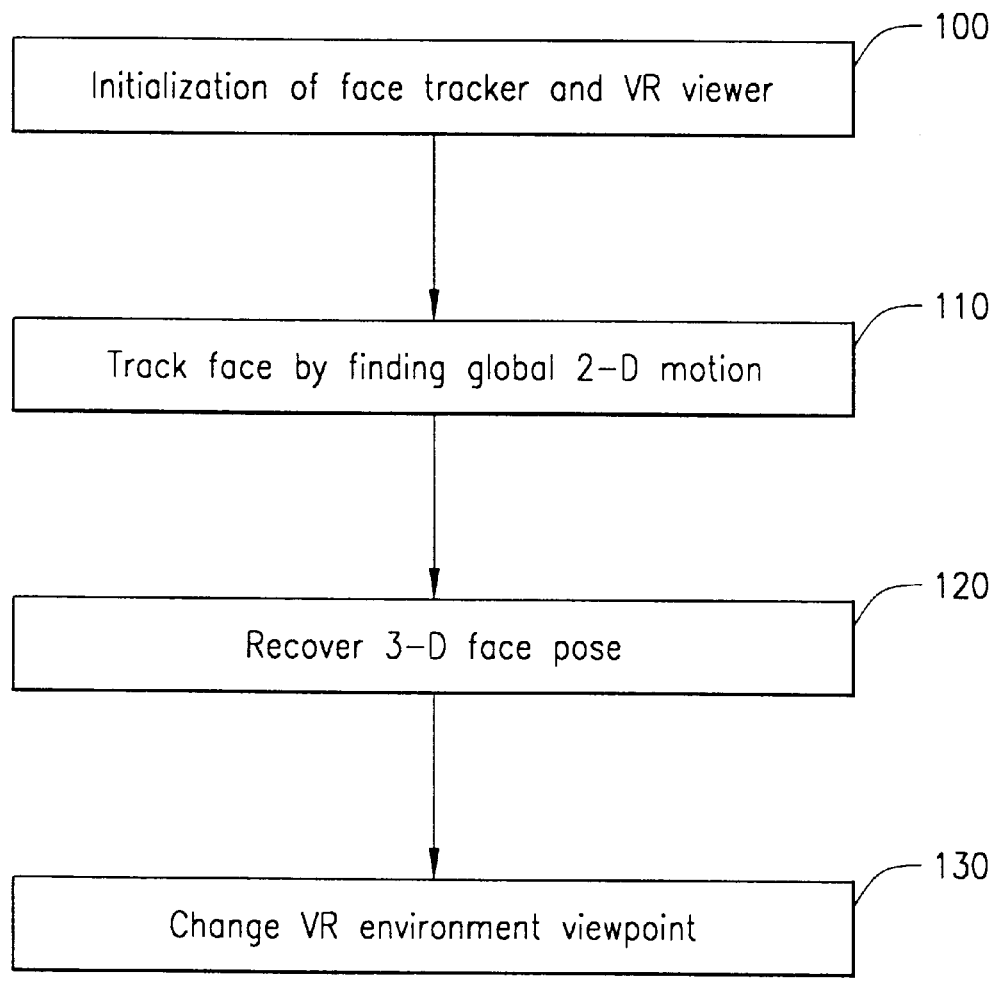
FIG. 5 is a flow chart showing the steps of the system incorporating the principles of the present invention.

Referring now to FIG. 5, a flow chart of the present invention is shown. At step 100 initialization is done by just taking a snapshot of the face in a neutral pose (facing directly ahead below the camera). This reference face snapshot is used to track the pose of the face. At the same time, the virtual reality environment viewer is initialized to show a default viewpoint. At step 110, tracking by 2-D global motion recovery is done using all the pixels in the image patch of the face. This is considerably more robust than tracking specific small local features. To reduce dependency of the approach to illumination, an edge strength image is used rather than a direct intensity image. 2-D global motion is recovered by affine warping the reference face image (that has been taken during the initialization step 100) so as to minimize its intensity difference with the current image face. This is equivalent to deformable template matching with global motion.

At step 120, the warping transformation matrix is then decomposed to yield both position and orientation, or pose, of the face. Subsequently, at step 130, the perceived change in pose of the face is used to effect change of viewpoint within the virtual reality environment viewer.

Having described a preferred embodiment of the invention, it will now become apparent to one skilled in the art that other embodiments incorporating its concepts may be used. It is felt therefore, that this embodiment should not be limited to the disclosed embodiment, but rather should be limited only by the spirit and the scope of the appended claims.

What is claimed is:

1. A hands-free navigation system for tracking a head and responsively adjusting the display of a virtual reality environment, the system comprising:
   a three-dimensional environment viewer for display of the virtual reality environment;
   a digitizer for providing two-dimensional images of a face of a head; and
   a face tracker including:
      means for receiving a reference face image from the digitizer;
      means for receiving a current face image from the digitizer;
      means for determining a head translation and orientation from the reference face image to the current face image; and
      means for providing the head translation and orientation to the three-dimensional environment viewer, thereby displaying the virtual reality environment at a desired viewpoint.

2. The hands-free navigation system of claim 1 further comprising a camera for providing images to the digitizer, wherein the camera is mounted in front of and above the head and is positioned at a tilted angle to the head.

3. The hands-free navigation system of claim 1 wherein the means for receiving a reference face image comprises means for receiving a snapshot of the face in a neutral position.

4. The hands-free navigation system of claim 1 wherein the means for determining a head translation and orientation comprises:
   means for warping the reference face image to minimize a difference between the warped reference face image and the current face image to provide a warping matrix transformation; and
   means for decomposing the warping matrix transformation to yield the head translation and orientation.

5. The hands-free navigation system of claim 4 wherein the means for warping the reference face image comprises:
   means for producing a two-dimensional motion matrix;
   means for decomposing the two-dimensional motion matrix into a plurality of warping parameters, the warping parameters including:
      a displacement variable;
      a rotational angle about a viewing axis variable;
      a zoom factor variable;
      an aspect ratio variable;
      a skew factor variable;
      a pinch parameter variable in an x direction; and
      a pinch parameter variable in a y direction;
   means for approximating the two-dimensional motion matrix using an affine tracking to determine a limited head pose; and
   means for tracking a center of an affine patch.

6. A method of hands-free navigation for tracking a head and responsively adjusting the display of a virtual reality environment, the method comprising the steps of:
   providing a digitizer;
   providing a face tracker;
   receiving a reference face image in the face tracker from the digitizer;
   receiving a current face image in the face tracker from the digitizer;
   determining a head translation and orientation from the reference face image to the current face image;
   providing the head translation and orientation to a three-dimensional environment viewer to display the virtual reality environment at a desired viewpoint; and
   repeating the steps of receiving the current face image and providing the head translation and orientation to the three-dimensional environment viewer to continue to display the virtual reality environment at desired viewpoints.

7. The method of hands-free navigation according to claim 6 wherein the step of receiving the reference face image in the face tracker from the digitizer comprises the step of receiving an image of a face in a neutral position.

8. The method of hands-free navigation according to claim 6 wherein the step of determining the head translation and orientation comprises the steps of:
   warping the reference face image to minimize a difference between the warped reference face image and the current face image to provide a warping matrix transformation; and
   decomposing the warping matrix transformation to yield the head translation and orientation.

9. The method of hands-free navigation according to claim 8 wherein the step of warping the reference face image comprises the steps of:

produce a two-dimensional motion matrix;

decomposing the two-dimensional motion matrix into a plurality of warping parameters, the warping parameters including:

a displacement variable;

a rotational angle about a viewing axis variable;

a zoom factor variable;

an aspect ratio variable;

a skew factor variable;

a pinch parameter variable in an x direction; and a pinch parameter variable in a y direction;

approximating the two-dimensional motion matrix using an affine tracking to determine a limited head pose; and tracking a center of an affine patch.

* * * * *